(12) United States Patent
Matsuoka et al.

(10) Patent No.: US 11,998,941 B2
(45) Date of Patent: Jun. 4, 2024

(54) ELECTROSTATIC ATOMIZING SYSTEM, AND METHOD FOR FAULT DETECTION IN ELECTROSTATIC ATOMIZING SYSTEM

(71) Applicant: Panasonic Intellectual Property Management Co., Ltd., Osaka (JP)

(72) Inventors: Masaru Matsuoka, Osaka (JP); Takahiro Yamaguchi, Osaka (JP); Kenichi Kajiyama, Hyogo (JP); Yuki Noda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1369 days.

(21) Appl. No.: 16/366,518

(22) Filed: Mar. 27, 2019

(65) Prior Publication Data

US 2020/0094279 A1    Mar. 26, 2020

Related U.S. Application Data

(60) Provisional application No. 62/734,257, filed on Sep. 21, 2018.

(51) Int. Cl.
*B05B 5/03* (2006.01)
*B05B 5/16* (2006.01)
(Continued)

(52) U.S. Cl.
CPC ............. *B05B 5/032* (2013.01); *B05B 5/03* (2013.01); *B05B 5/16* (2013.01); *B05B 7/0012* (2013.01);
(Continued)

(58) Field of Classification Search
CPC ........... B05B 15/65; B05B 5/03; B05B 5/032; B05B 5/16; B05B 7/0012; B05B 12/004
(Continued)

(56) References Cited

U.S. PATENT DOCUMENTS 5,563,811 A * 10/1996 Embree ............... B05B 17/0615
331/109
5,850,976 A    12/1998 Robidoux
(Continued)

FOREIGN PATENT DOCUMENTS

CN         105857896        12/2017
DE    10 2004 014 646        7/2005
(Continued)

OTHER PUBLICATIONS

Office Action dated Jul. 30, 2021 in U.S. Appl. No. 16/296,847.
(Continued)

*Primary Examiner* — Christopher R Dandridge
(74) *Attorney, Agent, or Firm* — Wenderoth, Lind & Ponack, L.L.P.

(57) ABSTRACT

An electrostatic atomizing system includes an air flow path having an air intake port and an air exhaust port, a humidifying device, an electrostatic atomizing apparatus, a first sensor, and a control unit. The humidifying device humidifies the air taken in through the air intake port. The electrostatic atomizing apparatus includes an electrode section operable to produce charged particulate water by causing the water in the air humidified by the humidifying device to condense on an electrode and applying voltage to that electrode. Moreover, the electrostatic atomizing apparatus exhausts air that contains the charged particulate water through the air exhaust port. The first sensor senses at least one of humidity and temperature of the air humidified by the humidifying device. The control unit determines, based on a sensing result of the first sensor, if there is a fault in the humidifying device or the electrostatic atomizing apparatus, and outputs the result of the determination.

12 Claims, 7 Drawing Sheets

(51) Int. Cl.
  *B05B 7/00* (2006.01)
  *B05B 12/00* (2018.01)
  *B05B 15/65* (2018.01)
  *B64D 13/06* (2006.01)
  *F24F 6/00* (2006.01)
  *F24F 6/14* (2006.01)

(52) U.S. Cl.
  CPC ............ *B05B 12/004* (2013.01); *B05B 15/65* (2018.02); *B64D 13/06* (2013.01); *F24F 6/00* (2013.01); *F24F 6/14* (2013.01); *B64D 2013/067* (2013.01); *F24F 2006/008* (2013.01)

(58) Field of Classification Search
  USPC .................................................. 239/690–708
  See application file for complete search history.

(56) References Cited

U.S. PATENT DOCUMENTS

| | | | |
|---|---|---|---|
| 9,415,412 | B2 | 8/2016 | Kawashima et al. |
| 2011/0180618 | A1 | 7/2011 | Schumacher et al. |
| 2017/0294665 | A1* | 10/2017 | Ok .................... H01M 8/04089 |

FOREIGN PATENT DOCUMENTS

| | | | | |
|---|---|---|---|---|
| DE | 10 2008 036 425 | | 2/2010 | |
| EP | 0 627 253 | | 12/1994 | |
| EP | 2 236 951 | | 10/2010 | |
| EP | 2 639 518 | | 9/2013 | |
| JP | 64-16991 | | 1/1989 | |
| JP | 5-302739 | | 11/1993 | |
| JP | 10-151314 | | 6/1998 | |
| JP | 2001-146019 | | 5/2001 | |
| JP | 2006-305321 | | 11/2006 | |
| JP | 2007-106130 | | 4/2007 | |
| JP | 2008-201142 | | 9/2008 | |
| JP | 2009-8291 | | 1/2009 | |
| JP | 2009-100850 | | 5/2009 | |
| JP | 4778276 | | 7/2011 | |
| JP | 2011-169574 | | 9/2011 | |
| JP | 4877410 | | 12/2011 | |
| JP | 2012-11093 | | 1/2012 | |
| JP | 2013-511382 | | 4/2013 | |
| JP | 2013-96690 | | 5/2013 | |
| JP | 2013-527020 | | 6/2013 | |
| JP | 2013108722 | * | 6/2013 | ............... F24F 6/12 |
| JP | 2013-240446 | | 12/2013 | |
| JP | 2015-72112 | | 4/2015 | |
| JP | 2016-95115 | | 5/2016 | |
| JP | 2017-67303 | | 4/2017 | |
| WO | 2005/092155 | | 10/2005 | |
| WO | 2006/093190 | | 9/2006 | |
| WO | 2008/007704 | | 1/2008 | |
| WO | 2011/061479 | | 5/2011 | |
| WO | 2011/061480 | | 5/2011 | |

OTHER PUBLICATIONS

Extended European Search Report dated Sep. 23, 2019 in European Application No. 19165433.4.
Extended European Search Report dated Sep. 18, 2019 in European Application No. 19159241.9.
Extended European Search Report dated Sep. 24, 2019 in European Application No. 19159242.7.

* cited by examiner

ELECTROSTATIC ATOMIZING SYSTEM, AND METHOD FOR FAULT DETECTION IN ELECTROSTATIC ATOMIZING SYSTEM

CROSS-REFERENCE TO RELATED APPLICATION

This application claims benefit to U.S. provisional application No. 62/734,257, filed on Sep. 21, 2018. The entire disclosure of U.S. provisional application 62/734,257 is hereby incorporated herein by reference.

BACKGROUND

Technical Field

The present disclosure relates to an electrode cooling-type electrostatic atomizing system that produces charged particulate water by cooling a water application electrode and causing water vapor in the air to condense on the water application electrode, thereby eliminating the need to directly supply water to the water application electrode; and to a method for fault detection in the electrostatic atomizing system.

Background Art

Japanese Patent No. 4778276 discloses a Peltier unit that produces condensation water by cooling ambient air, and an electrostatic atomizing apparatus that atomizes, by applying voltage, the condensation water produced by the Peltier unit. This electrode cooling-type electrostatic atomizing apparatus is advantageous in that it is not necessary to directly supply water to the water application electrode and, as such, labor and management related to supplying water and the like can be reduced.

BRIEF SUMMARY

Cabins of aircraft flying at high altitudes such as 10 km, for example, are ventilated by introducing outside air. The cabin humidity is affected by the outside air humidity, resulting in low humidity conditions such as, for example, a relative humidity of 10%. Humidity sufficient for electrostatic atomization must be obtained in order for electrode cooling-type electrostatic atomizing apparatuses to operate in low humidity conditions. Moreover, for these types of electrostatic atomizing apparatuses, a greater amount of labor related to the maintenance and inspection of the electrostatic atomizing apparatus is involved.

The present disclosure provides an electrostatic atomizing system that is effective for facilitating the management of an electrode cooling-type electrostatic atomizing system used in a low humidity environment such as in an aircraft; and a method for fault detection in the electrostatic atomizing system.

The electrostatic atomizing system according to the present disclosure includes an air flow path having an air intake port and an air exhaust port, a humidifying device operable to humidify air taken in through the air intake port, an electrostatic atomizing apparatus, a first sensor, and a control unit. The electrostatic atomizing apparatus includes an electrode section operable to produce charged particulate water by causing the water in the air humidified by the humidifying device to condense on an electrode and applying voltage to that electrode. Moreover, the electrostatic atomizing apparatus exhausts air that contains the charged particulate water through the air exhaust port. The first sensor senses at least one of humidity and temperature of the air humidified by the humidifying device. The control unit determines, based on a sensing result of the first sensor, if there is a fault in the humidifying device or the electrostatic atomizing apparatus, and outputs a result of the determination.

The method for fault detection in the electrostatic atomizing apparatus according to the present disclosure includes detecting a fault in an electrostatic atomizing system including an air flow path that has an air intake port and an air exhaust port, a humidifying device operable to humidify air taken in through the air intake port, and an electrostatic atomizing apparatus that includes an electrode section operable to produce charged particulate water by causing the water in the air humidified by the humidifying device to condense on an electrode and applying voltage to that electrode and operable to exhaust air containing the charged particulate water through the air exhaust port. This method includes sensing at least one of humidity and temperature of the air humidified by the humidifying device, determining, based on a result of the sensing, if there is a fault in the humidifying device or the electrostatic atomizing apparatus, and outputting a result of the determination.

DETAILED DESCRIPTION

Next, embodiments of the present disclosure are described in detail while referencing the drawings. Note that, in some cases, unnecessarily detailed descriptions are foregone. For example, detailed descriptions of well-known matters and redundant descriptions of configurations and constituents that are substantially the same may be foregone.

Note that the following description and attached drawings are provided for the purpose of enabling a person skilled in the art to comprehend the present disclosure, and are not intended to limit the subject matters recited in the claims.

The following description gives an example of an electrostatic atomizing system that is installed in an aircraft and that electrostatically atomizes humidified air.

A typical aircraft takes in outside air. At high altitudes of 10 km, the ambient temperature is about −55° C. and, as such, even if that air is heated, the amount of water vapor contained therein is very small. Additionally, aircraft are used for a long period of time. Specifically, it is said that aircraft have a life of about 30 years. Since the structures of aircraft are mainly metal, in order to prevent corrosion and fatigue failure due to repeated expansion and contraction caused by water adhesion, humidification to the humidity at which humans feel comfortable (about 40% to 50%) is not acceptable.

Due to these reasons, unlike home environments, the humidity in an aircraft is extremely low, and the water necessary for electrode cooling-type electrostatic atomizing systems cannot be supplied from the air. As such, a humidifying device is needed. However, in the unique environment of the aircraft, it is difficult to always be reachable to a water source, and weight directly links to fuel costs. As such, the amount of supplied water should be minimized. Furthermore, as described above, the humidified interior of the entire aircraft raises a concern about corrosion and fatigue failure. As such, humidification should be performed only near the passengers. However, this leads to multiple humidifying devices being needed, and a significant number of man-hours are needed to manage these humidifying devices.

The electrostatic atomizing system and the method for fault detection in the electrostatic atomizing system according to the present disclosure effectively solve the problems described above. The present disclosure describes embodiments of the electrostatic atomizing system and the method for fault detection in the electrostatic atomizing system in the following.

1. Embodiment 1

1-1 Configuration

Figure 1:
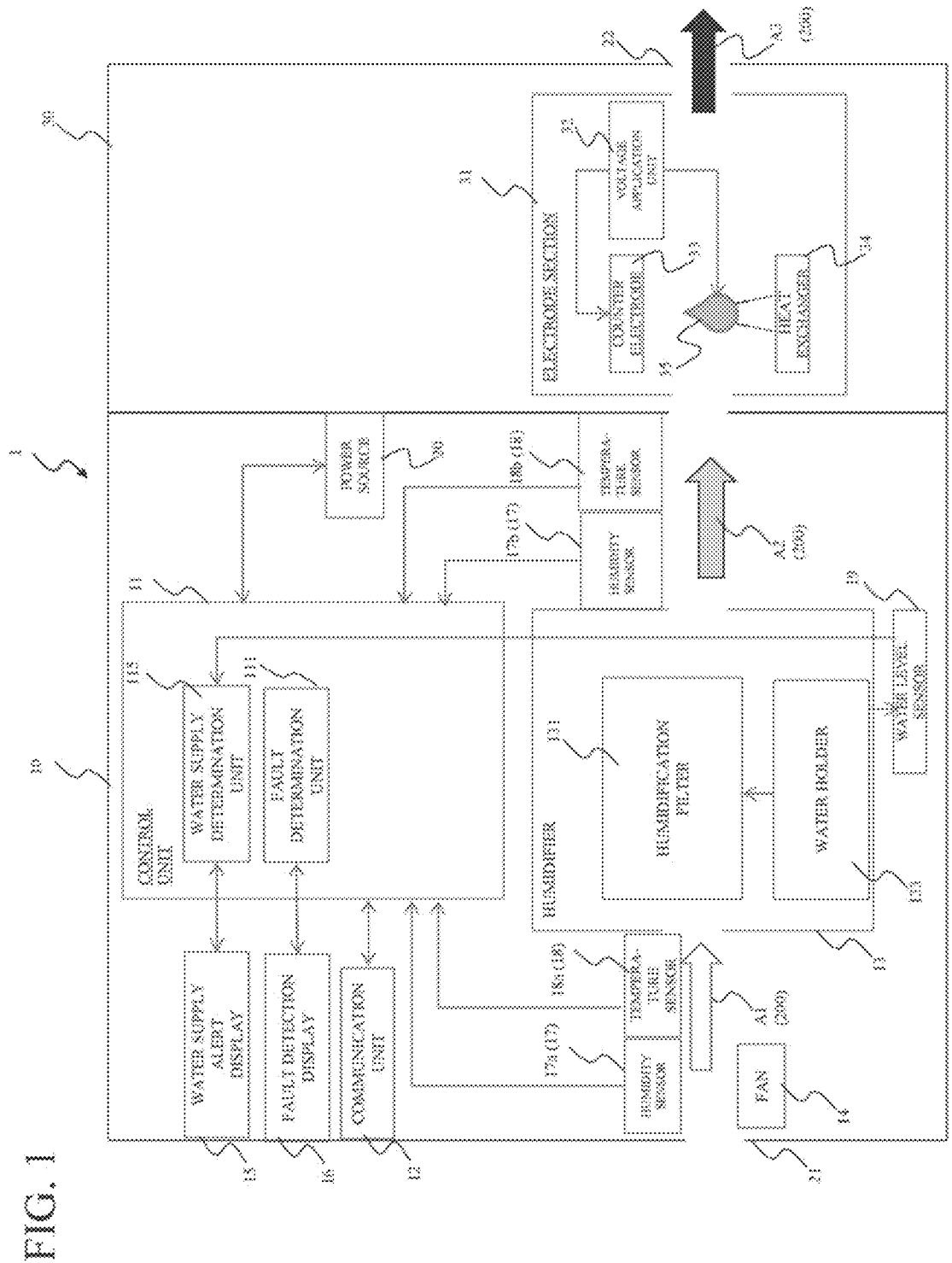
FIG. 1 illustrates the configuration of an electrostatic atomizing system according to Embodiment 1.

FIG. 1 illustrates the configuration of an electrostatic atomizing system 1 that is to be installed in an aircraft. The electrostatic atomizing system 1 according to Embodiment 1 includes a humidifying device 10, an electrostatic atomizing apparatus 30, and an air flow path 200 including an air intake port 21 and an air exhaust port 22.

The humidifying device 10 can be connected to the electrostatic atomizing apparatus 30 or used alone, and can be installed in the aircraft near a seat (front surface of the seat, rear surface of the seat, side surface of the seat, under the seat, in the armrest, or the like), near the aisle (under the floor, in the ceiling, or the like), near the galley, near the lavatory, in a moving body (meal trolley, trash collection trolley, or the like), or the like.

The humidifying device 10 humidifies air A1 taken in through the air intake port 21 and produces humidified air A2. The electrostatic atomizing apparatus 30 produces charged particulate water by causing the water in the air A2 humidified by the humidifying device 10 to condense on an electrode, and applying voltage to that electrode. Moreover, the electrostatic atomizing apparatus 30 exhausts air A3 that contains the charged particulate water through the air exhaust port 22.

Note that, in FIG. 1, the arrows of the air A1, A2, and A3 represent the flow of air.

1-1-1 Configuration of Humidifying Device

The humidifying device 10 includes a control unit 11, a communication unit 12, a humidifier 13, a fan 14, a water supply alert display 15, a fault detection display 16, humidity sensors 17 (17a, 17b), temperature sensors 18 (18a, 18b), and a water level sensor 19.

The humidity sensors 17a and 17b are sensors, or the like, that measure humidity. The humidity sensor 17a (example of the second sensor) is disposed upstream from the humidifier 13 in the air flow path 200, senses the humidity of the unhumidified air A1 that flows into the humidifier 13, and sends the sensed humidity information to the control unit 11. The humidity sensor 17b (example of the first sensor) is disposed downstream from the humidifier 13 in the air flow path 200, senses the humidity of the humidified air A2 that is exhausted from the humidifier 13, and sends the sensed humidity information to the control unit 11.

Note that, in the present disclosure, unless otherwise noted, the term "humidity" refers to relative humidity. Since relative humidity is dependent on temperature, the relative humidity is lower when the temperature is higher, while the amount of water vapor in the air is the same.

The temperature sensors 18a and 18b are sensors, or the like, that measure temperature. The temperature sensor 18a (example of the second sensor) is disposed upstream from the humidifier 13 in the air flow path 200, senses the temperature of the unhumidified air A1 that flows into the humidifier 13, and sends the sensed temperature information to the control unit 11. The temperature sensor 18b (example of the first sensor) is disposed downstream from the humidifier 13 in the air flow path 200, senses the temperature of the humidified air A2 that is exhausted from the humidifier 13, and sends the sensed temperature information to the control unit 11.

The water level sensor 19 (example of the fourth sensor) is a sensor such as a weight sensor, an optical sensor, and a capacitance sensor. The water level sensor 19 measures the water level in a water holder 133 and sends the measured water level information to the control unit 11. Note that the information sensed by the water level sensor 19 is not limited to the water level. That is, the water level sensor 19 may sense any type of information that identifies the amount of water in the container. Examples of such information include the weight of the water and the like.

The humidifier 13 includes a humidification filter 131 and the water holder 133. In one example, the humidification filter 131 is a corrugated humidification filter and absorbs the water held in the water holder 133. Low humidity air passes through the gaps in the humidification filter 131 while the humidification filter 13 is holding water and, as a result, the water vaporizes from the surfaces in the humidification filter 131 to humidify the low humidity air, and as such, the humidity gets high. The humidification filter 131 has flame retardant characteristics and is less likely to burn in the event of a fire in the aircraft. The humidification filter 131 may also have corrosion resistance characteristics. Since the replenishment water evaporates slowly, continuous electrostatic vaporization during long flights is possible. Note that, in the humidifier 13, an ultrasonic humidification method, a vibration humidification method, a steam humidification method, a heating humidification method, or the like may be implemented in place of the humidification filter 13.

The water holder 133 includes a container for holding water. The water holder 133 forms a passage for taking the unhumidified air A1 into the water holder 133, and a passage for sending the humidified air A2 out of the water holder 133.

The control unit 11 consists of one or a plurality of microcomputers/microcontrollers. In one example, the microcomputer/microcontroller includes a processor that includes a circuit such as a CPU, and a storage unit such as ROM, flash memory, RAM, or the like. Using the RAM as workspace, the processor executes computer programs stored in the ROM to realize the functions of a fault determination unit 111, a water supply determination unit 115, and the like of the control unit 11.

The control unit 11 acquires the values of the humidity sensed by the humidity sensors 17a and 17b. The control unit 11 acquires the values of the temperatures sensed by the temperature sensors 18a and 18b. The fault determination unit 111 of the control unit 11 determines a fault in the humidifying device 10 on the basis of the values of the sensed humidify and the values of the sensed temperatures, and outputs the determination results. The phrase "fault in the humidifying device 10" includes, for example, insufficiencies in humidity including shortages of water in the water holder 133, failure of the fan 14, clogging of the humidification filter 13, and the like.

For example, the fault determination unit 111 determines whether the values of the humidity sensor 17b and the temperature sensor 18b for the air A2 exhausted from the humidifier 13 are values or are within a numerical range of the required humidity and temperature, stored in advance in the memory (hereinafter referred to as "first predetermined value range"). A fault is detected if the values are outside the first predetermined value range. In one example, the first predetermined value range is a range in which it is thought that humidity is insufficient and electrostatic atomization cannot be properly performed. For example, the first predetermined range is a range in which the humidity is less than 20% or the temperature is 30° C. or higher.

Additionally, the fault determination unit 111 calculates a difference between the value of the humidity sensor 17a and the value of the humidity sensor 17b (before and after the humidifier 13). The fault determination unit 111 also calculates a difference between the value of the temperature sensor 18a and the value of the temperature sensor 18b (before and after the humidifier 13). The fault determination unit 111 can detect failures of the fan 14 and clogging of the humidification filter 13 on the basis of these differences and required values or numerical ranges of the differences, which are stored in advance in the memory (hereinafter referred to as "second predetermined value range"). For example, in cases in which the fan 14 functions normally, the humidification filter 131 does not clog, and the air A1 flows as expected, the air A2 that has passed through the humidifier 13 has a lower temperature and a higher humidity than the air A1 that has not passed through the humidifier 13. However, if the fan 14 has failed and/or the humidification filter 131 clogs and the air A1, A2 does not flow as expected, the relationship between the temperature and/or the humidity of the air A1, A2 before and after passing through the humidifier 13 becomes inconsistent. Thus, in cases in which the temperature and/or the humidity of the air A1, A2 before and after passing through the humidifier 13 are unrelated numerical values, it is presumed that air A1, A2 does not flow as expected. In such cases, the fault determination unit 111 may determine that the fan 14 has failed or that the humidification filter 131 clogs.

The fault determination unit 111 may determine a fault in accordance with the sensed humidity or temperature. In such a case, the fault determination unit 111 may determine a fault by comparing the detected values with a fault reference value of the humidity or temperature, which is stored in advance in the memory.

The water supply determination unit 115 acquires, from the water level sensor 19, a value of the water level held in the water holder 133 and compares this value of the water level with a predetermined water level reference value stored in advance in the memory to determine if there is a need to supply water to the water holder 133, and outputs the determination results. The water supply determination unit 115 may generate and output the time of supplying water in advance, on the basis of the acquired value of the water level. Additionally, the water supply determination unit 115 may acquire the difference between the value of the humidity sensor 17a and the value of the humidity sensor 17b (before and after the humidifier 13) immediately after water is replenished and the difference between the value of the temperature sensor 18a and the value of the temperature sensor 18b (before and after the humidifier 13) immediately after water is replenished, and predict, on the basis of these differences, the time of supplying water. For example, the water supply determination unit 115 can calculate, from the recent water drop speed or the anticipated amount of humidification, which is stored in the control unit 11, the time at which water will be depleted and will be replenished.

The fault detection display 16 is an LED or similar indicator, display, or the like, and outputs the results determined by the fault determination unit 111 as a flashing display, a message display, or the like.

The water supply alert display 15 is an LED or similar indicator, display, or the like, and outputs the results determined by the water supply determination unit 115 as a flashing display, a message display, or the like.

Note that the fault detection display 16 and the water supply alert display 15 may carry out a display indicating "normal" when there is no need to supply water and there are no faults.

Figure 2:
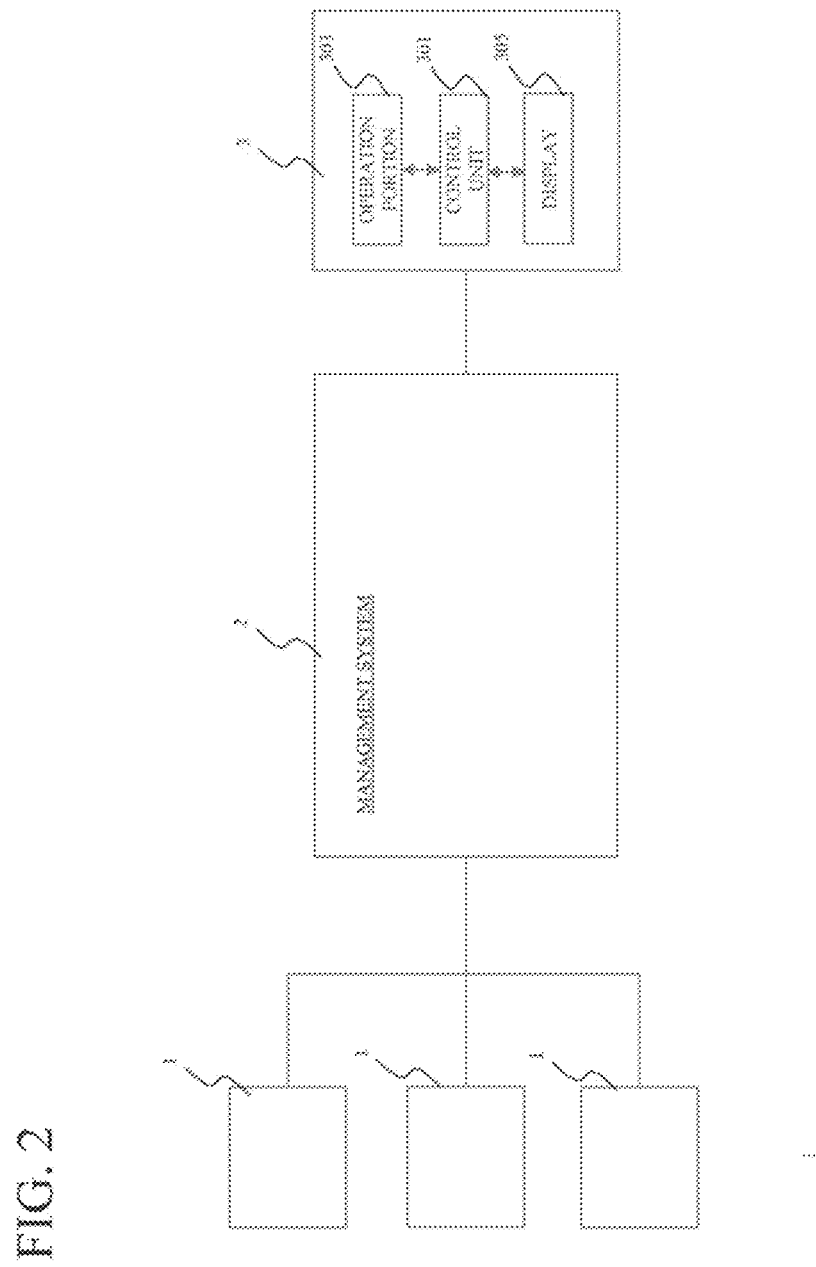
FIG. 2 illustrates the configuration of a system that includes a management system and the electrostatic atomizing system according to Embodiment 1.

The communication unit 12 is a circuit for communicating with other devices. In one example, as illustrated in FIG. 2, each electrostatic atomizing system 1 is connected, via the communication unit 12, to a management system 2 installed in the aircraft. The control unit 11 sends, via the communication unit 12, various values such as the sensed humidity, temperatures, and water level, and information such as the results of the fault determination, the time of supplying water to the humidifier 13, and the like to the management system 2. The management system 2 can centrally manage multiple electrostatic atomizing systems 1 in an aircraft. In one example, the remaining amount of water, the time of supplying water, and fault detection of the humidifying device 10 of each electrostatic atomizing system 1 can be displayed on a seating chart that is shown in a screen of an information terminal 3 connected to the management system 2. The information terminal 3 includes a CPU or similar control unit 301, a touch panel, a keyboard, a mouse, or similar operation portion 303, and a liquid crystal display or similar display 305. A cabin attendant or other administrator of the aircraft can ascertain and centrally manage the state of each humidifying device 10 without needing to directly inspect each humidifying device 10. Thus, the work of managing the humidifying devices 10 can be reduced.

1-1-2 Electrostatic Atomizing Apparatus

The electrostatic atomizing apparatus 30 includes an electrode section 31. The electrode section 31 operates by using power from a power source 20 and, as illustrated in FIG. 1, includes a water application electrode 35, a voltage application unit 32, a counter electrode 33, and a heat exchanger 34. The water application electrode 35 is cooled by the heat exchanger 34 that has received a command from the control unit 11. The water vapor in the humidified air A2 is cooled and liquefied to be condensed on the water application electrode 35. The voltage application unit 32 applies, via the power source 20, high voltage between the counter electrode 33 and the water application electrode 35. The heat exchanger 34 may be implemented as a device such as a Peltier element that cools by electrical control, a device that cools by a heat pump mechanism such as a compressor, or may be implemented as another device or method.

High voltage is applied to the counter electrode 33 and the water application electrode 35 that is cooled and on which condensation has formed. As a result, the condensed water on the water application electrode 35 is pulled to the counter electrode 33, charged negatively by the water application electrode 35, and split. As a result, charged particulate water is spread into the air A2, thereby producing the air A3. Note that, since charged particulate water production using the electrode section 31 is a well-known technique (see Japanese Patent No. 4877410, for example), detailed description thereof is foregone.

The electrostatic atomizing apparatus 30 exhausts the air A3 that contains the charged particulate water through the air exhaust port 22. Any of pollen antigens, molds, fungi, viruses, and the like can be inactivated, and odor prevention and moisturization can be enhanced by the exhausted air A3.

1-2 Operations 1-2-1 Fault Detection Operations

FIG. 3 is a flow chart illustrating the operations of fault detection in mainly the humidifying device 10 of the electrostatic atomizing system 1. The following description uses this chart.

First, the power source 20 turns ON and the humidifying device 10 and the electrostatic atomizing apparatus 30 start (S000). Note that, the humidifying device 10 can be started by manually pressing a power button (not illustrated in the drawings) provided on the main body of the humidifying device 10, or can be started by receiving a start command from an external device via the communication unit 12.

Next, the fault determination unit 111 of the control unit 11 acquires the humidity and the temperature, measured by the humidity sensor 17*b* and the temperature sensor 18*b*, of the humidified air A2. It is determined whether the temperature and the humidity are within the first predetermined value range (S001). When the temperature and the humidity are not within the first predetermined value range, determination results indicating a fault are output, and displayed by the fault detection display 16 (S002). In this example, the fault determination indicates insufficient humidity. Note that the determination results may be noticed to the management system 2 via the communication unit 12.

Next, the fault determination unit 111 of the control unit 11 calculates the difference between the value of the humidity sensor 17*a* and the value of the humidity sensor 17*b* (before and after the humidifier 13), and the difference between the value of the temperature sensor 18*a* and the value of the temperature sensor 18*b* (before and after the humidifier 13), and determines whether these differences are within the second predetermined value range (S003). When the differences are not within the second predetermined value range, determination results indicating a fault are output and displayed by the fault detection display 16 (S004). In this example, the fault determination indicates a failure of the fan 14 or clogging of the humidification filter 131. The determination results are noticed to the management system 2 via the communication unit 12.

Next, the control unit 11 determines whether the operation flow of the humidifying device 10 is completed (S111). If it is determined that the operations flow is completed, the operation of the electrostatic atomizing system 1 ends. For example, in a case in which the electrostatic atomizing system 1 of the present disclosure is installed in an aircraft, the operations of the electrostatic atomizing system 1 may be ended by automatically turning OFF the power source 20 of the electrostatic atomizing system 1 at the timing when a change occurs in the flight phase (takeoff, cruising, landing, or the like), the cabin situation (whether meal service is provided, whether lavatories are in use), or the altitude (at an altitude of 10 km, on the ground, or the like) of the aircraft. Meanwhile, when it is determined that the operations flow is not completed, step S001 is executed and the operations repeats.

In the operations described above, the order of processing of steps S001 to S002 and steps S003 to S004 may be reversed or performed simultaneously. Moreover, it is not necessary to execute both steps S001 to S002 and steps S003 to S004, and a configuration is feasible in which only steps S001 to S002 or steps S003 to S004 are executed.

In the operations described above, the fault is detected on the basis of the measured humidity and temperatures or the differences therebetween. However, the present disclosure is not limited thereto. Configurations are feasible in which faults are determined on the basis of only the measured humidity and the difference therebetween or only the measured temperatures and the difference therebetween.

1-2-2 Water Supply Alert Operations

FIG. 4 is a flow chart illustrating the operations of water supply alert output in mainly the humidifying device 10 of the electrostatic atomizing system 1. This flow chart is used in the following description.

As in FIG. 3, when the start processing (S000) is completed, the control unit 11 acquires the water level information of the water holder 133 that is sensed by the water level sensor 19. The water supply determination unit 115 of the control unit 11 compares the acquired water level with predetermined water level reference, and determines if the water level in the water holder 133 is higher than or equal to a predetermined value (S101). When it is determined that the water level is less than the predetermined value, the water supply determination unit 115 displays, on the water supply alert display 15, alert information that indicates that water should be supplied to the water holder 133 (S102). The water supply determination unit 115 may send alert information for prompting the supply of water to the management system 2 via the communication unit 12. When the supply of water is completed (S103; Yes), the water supply determination unit 115 cancels the displayed alert information (S104). Then, as in FIG. 3, the control unit 11 executes the end processing of the operations flow of the humidifying device 10 (S111).

In the operations described above, a configuration is feasible in which, when it is determined that the water level is sufficient in step S102, the water supply determination unit 115 predicts, on the basis of the water level information, the time of supplying water, and displays the prediction results on the water supply alert display 15 and/or sends the prediction results to the management system 2 via the communication unit 12.

1-3 Features and the Like

In the electrostatic atomizing system 1 and the method for fault detection used in this system according to Embodiment 1, the temperature or the humidity of the air A2 humidified by the humidifier 13 is acquired, and fault determination and output is performed on the basis of this temperature or humidity. As a result, faults in the humidifying device 10 can be detected more easily and more quickly.

In the electrostatic atomizing system 1 and the method for fault detection used in this system according to Embodiment 1, the water level of the humidifier 13 is acquired and, on the basis of that water level, it is determined if there is a need to supply water, the time to supply water is predicted, and the determination results and/or the prediction results are output. As a result, if and when water is to be supplied to the humidifying device 10 can be easily and quickly confirmed.

In the electrostatic atomizing system 1 and the method for fault detection used in this system according to Embodiment 1, the various types of information acquired and calculated by the control unit 11 are sent, via the communication unit 12, to the management system 2 and displayed on the information terminal 3. As a result, the operational states of the plurality of humidifying devices 10 can be centrally managed and collectively displayed, and the work of the administrator can be reduced.

2. Embodiment 2

Japanese Patent Nos. 4778276 and 4877410 disclose electrostatic vaporization methods. However, it is difficult to directly detect the presence of charged particulate water produced by electrostatic vaporization. Consequently, there is a problem in that it is difficult to appropriately ascertain whether charged particulate water is being produced normally.

An electrostatic atomizing system 201 and a method for fault detection used in this system according to Embodiment 2 detects faults in the production state of charged particulate water produced by the electrode section 31 of the electrostatic atomizing apparatus 30. The following description of the electrostatic atomizing system 201 and the method for fault detection used in this system according to Embodiment 2 focuses on the differences from the electrostatic atomizing system 1 of Embodiment 1. Note that constituents and functions that are the same as in Embodiment 1 are marked with the same reference numerals and detailed description thereof is foregone.

2-1 Configuration

Figure 5:
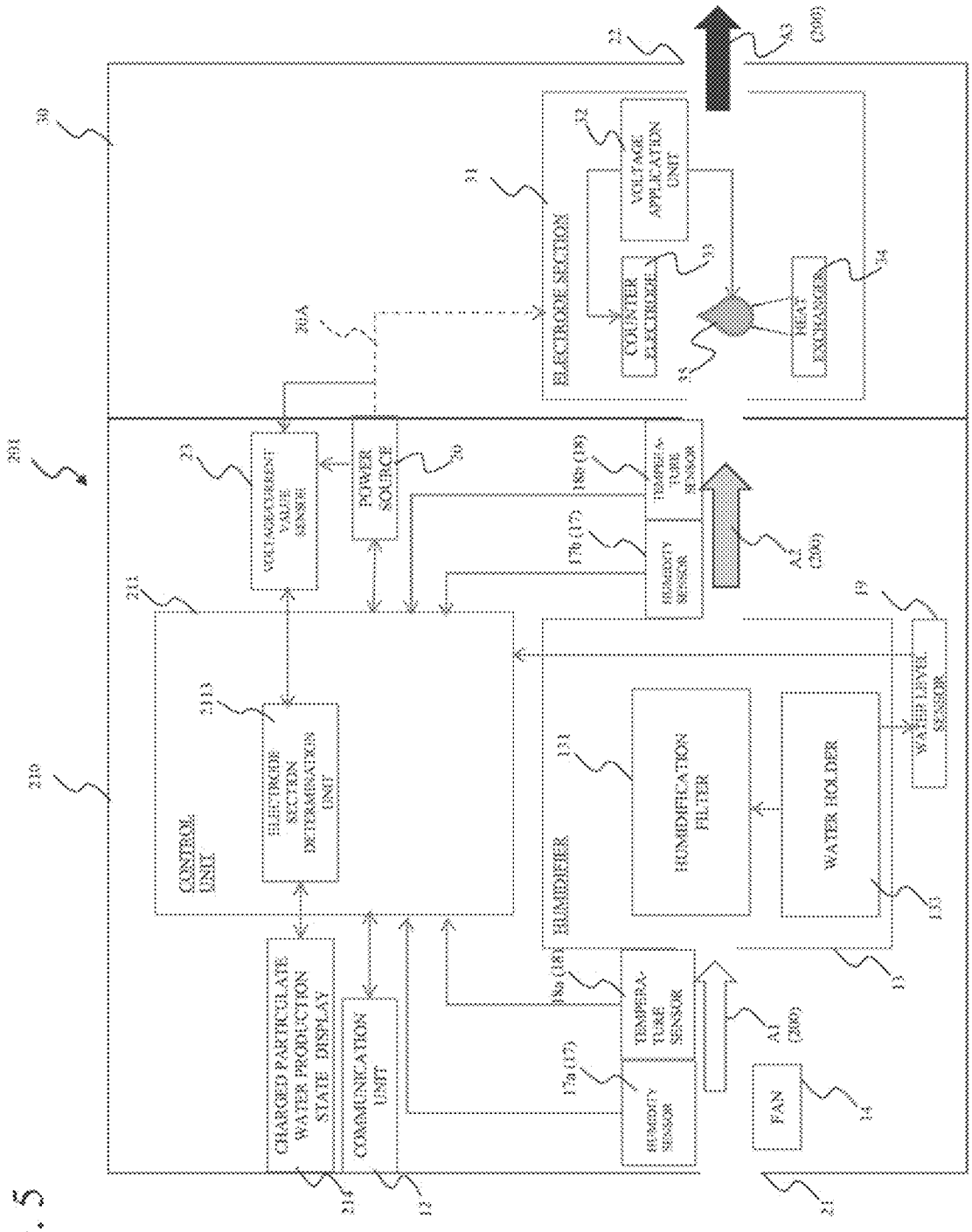
FIG. 5 illustrates the configuration of an electrostatic atomizing system according to Embodiment 2.

In the electrostatic atomizing system 201 illustrated in FIG. 5, a humidifying device 210 includes a voltage/current value sensor 23 (example of the third sensor) that measures a voltage value and a current value of the power source 20 supplied to the electrostatic atomizing apparatus 30 and sends the voltage value and the current value to a control unit 211, and a charged particulate water production state display 214 that displays the charged particulate water production state determined by the control unit 211. Note that the voltage/current value sensor 23 may be installed on the electrostatic atomizing apparatus 30 side.

In FIG. 5, arrow 20A represents power that is supplied from the power source 20 of the humidifying device 210 to the electrostatic atomizing apparatus 30.

As with the control unit 11, the control unit 211 includes a microcomputer/microcontroller and the like, and realizes the functions of an electrode section determination unit 2113. The electrode section determination unit 2113 acquires the temperature and the humidity of the air A2 that flows from the humidifying device 210 to the electrostatic atomizing apparatus 30, and the voltage value and the current value of the power source 20 supplied to the electrostatic atomizing apparatus 30. The electrode section determination unit 2113 compares the acquired temperature and humidity with reference values or a range of reference values of temperature and humidity (hereinafter referred to as "third predetermined value range), stored in advance in the memory, that satisfy the conditions for enabling the production of condensation water in the electrode section 31 of the electrostatic atomizing apparatus 30, and determines if there is a fault. Additionally, the electrode section determination unit 2113 determines whether the acquired voltage value and current value or the waveform patterns thereof match a voltage value and a current value or waveform patterns (hereinafter referred to as "fourth predetermined value range"), stored in advance in the memory, of the normal operation of the electrostatic atomizing apparatus 30. For example, in cases of insufficient humidity, discharge is not carried out and current does not flow if the condensation on the water application electrode 35 of the electrode section 31 is insufficient. Thus, faults in the production state of the charged particulate water can be detected on the basis of this current value. When the temperature, the humidity, the voltage value, and the current value satisfy the determination conditions, condensation water is generated properly in the electrostatic atomizing apparatus 30 and charged particulate water is produced. As such, a charged particulate water production state can be determined. When the temperature, the humidity, the voltage value, and the current value do not satisfy the determination conditions, there is a fault in the charged particulate water production state. As such, it can be determined that electrostatic atomization is not carried out properly. The electrode section determination unit 2113 outputs the determination results to the charged particulate water production state display 214. This configuration makes it possible for a user to confirm the charged particulate water production state.

Moreover, as in Embodiment 1, the control unit 211 can send information indicating the charged particulate water production state to the management system 2 via the communication unit 12. A cabin attendant or the like of the aircraft can confirm and centrally manage the states of the plurality of humidifying devices 210 and electrostatic atomizing apparatuses 30 without directly inspecting each electrostatic atomizing system 1. Thus, the workload of managing the humidifying devices 210 and the electrostatic atomizing apparatuses 30 can be reduced. Additionally, the management system 2 may send information indicating the charged particulate water production state of the corresponding electrostatic atomizing system 1 to a display terminal (not illustrated in the drawings) installed in each seat, and display the charged particulate water production state on the display terminal. This configuration makes it possible for a passenger to confirm that charged particulate water is produced.

The charged particulate water production state display 214 is an LED or similar indicator, display, or the like, and outputs the results determined by the electrode section determination unit 2113 as a flashing display, a message display, or the like.

2-2 Operations

Figure 6:
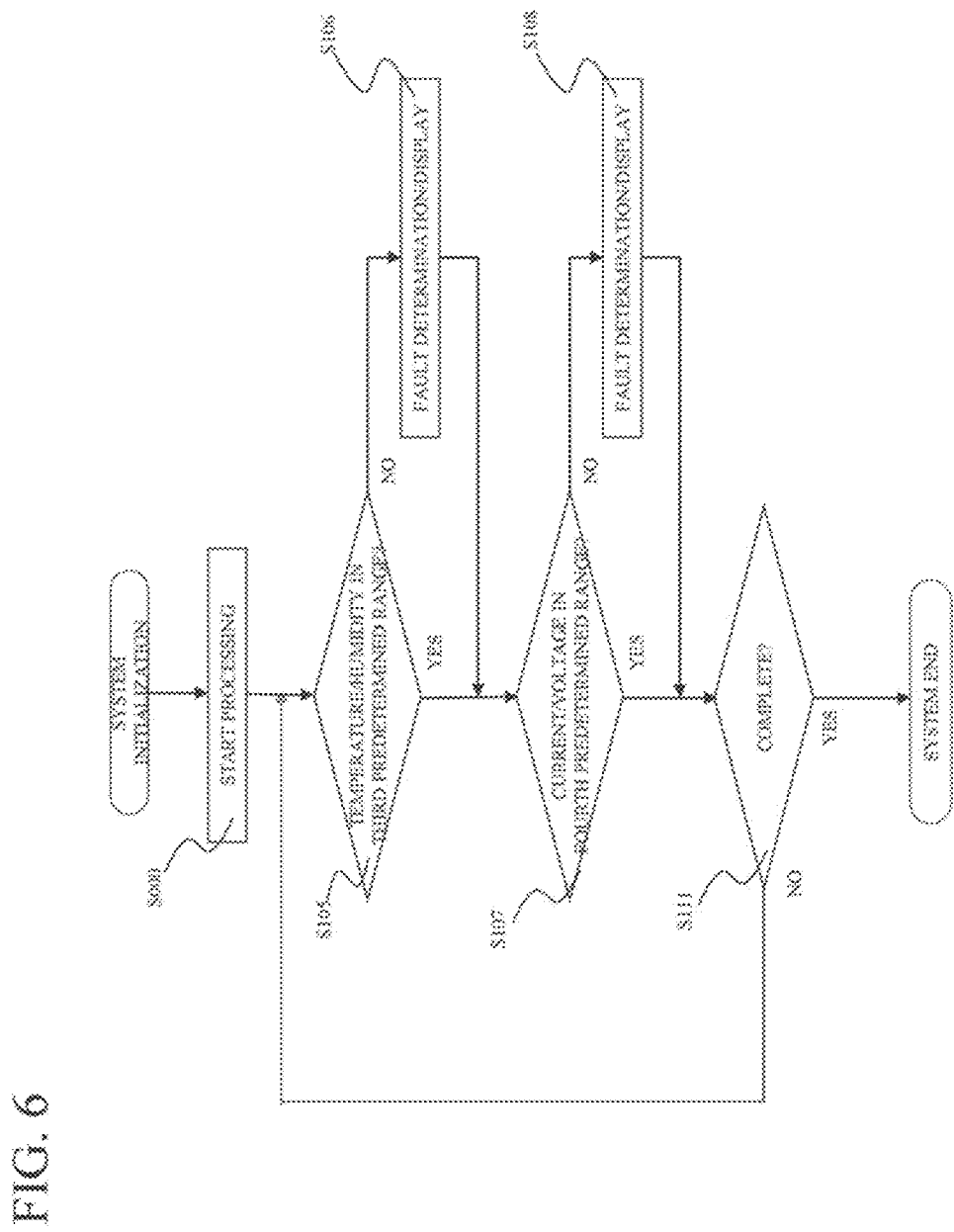
FIG. 6 is a flowchart illustrating fault detection operations of the electrostatic atomizing system according to Embodiment 2.

FIG. 6 is a flow chart illustrating the detection operations of the charged particulate water production state in mainly the humidifying device 210 of the electrostatic atomizing system 201. The following description uses this flow chart.

Figure 3:
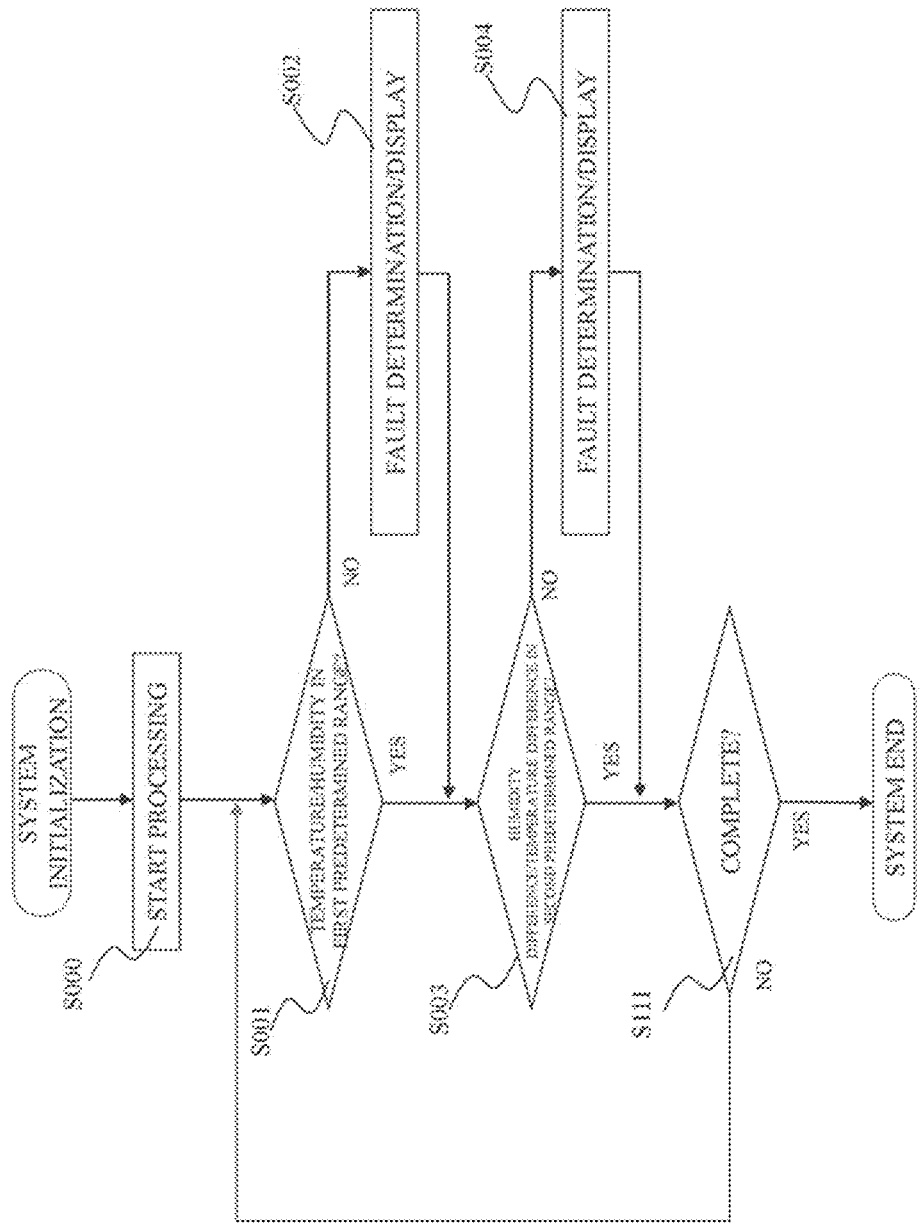
FIG. 3 is a flowchart illustrating fault detection operations of the electrostatic atomizing system according to Embodiment 1.

As in FIG. 3, when the start processing (S000) is completed, the control unit 211 acquires the humidity and the temperature, measured by the humidity sensor 17b and the temperature sensor 18b, of the humidified air A2, and determines if the temperature and the humidity are within the third predetermined value range (S105). The third predetermined value range indicates the value for the humidity that is sufficient for the production of charged particulate water and, for example, is humidity of 20% or higher. When the temperature and the humidity are not within the third predetermined value range, determination results indicating a fault are output and displayed on the fault detection display 16 (S106). Here, since the humidity is not enough for the production of charged particulate water, a fault is determined. Note that the determination results may be sent to the management system 2 via the communication unit 12.

Next, the electrode section determination unit 2113 of the control unit 211 determines whether the voltage value and the current value, or the wave patterns thereof, acquired by the voltage/current value sensor 23, are within the fourth predetermined value range (S107). When outside the fourth predetermined value range, the electrode section determination unit 2113 displays, on the charged particulate water production state display 214, information indicating that charged particulate water is not produced properly (S108). Note that this information may be sent to the management system 2 via the communication unit 12. Then, as in FIG. 3, the control unit 211 executes the end processing (S111).

In the operations described above, the order of steps S105 to S106 and steps S107 to S108 may be reversed or performed simultaneously. Moreover, it is not necessary to execute both steps S105 to S106 and steps S107 to S108, and a configuration is possible in which only steps S105 to S106 or steps S107 to S108 are executed.

In step S105 of the operations described above, the fault detection is carried out on the basis of the sensed humidity and temperature, but the present disclosure is not limited thereto. Configurations are feasible in which faults are determined on the basis of only the sensed humidity or only the sensed temperature.

In step S107 of the operations described above, the fault is detected on the basis of the detected current value and voltage value. However, the present disclosure is not limited thereto. Configurations are feasible in which faults are determined on the basis of only the measured current value or only the measured voltage value.

Figure 4:
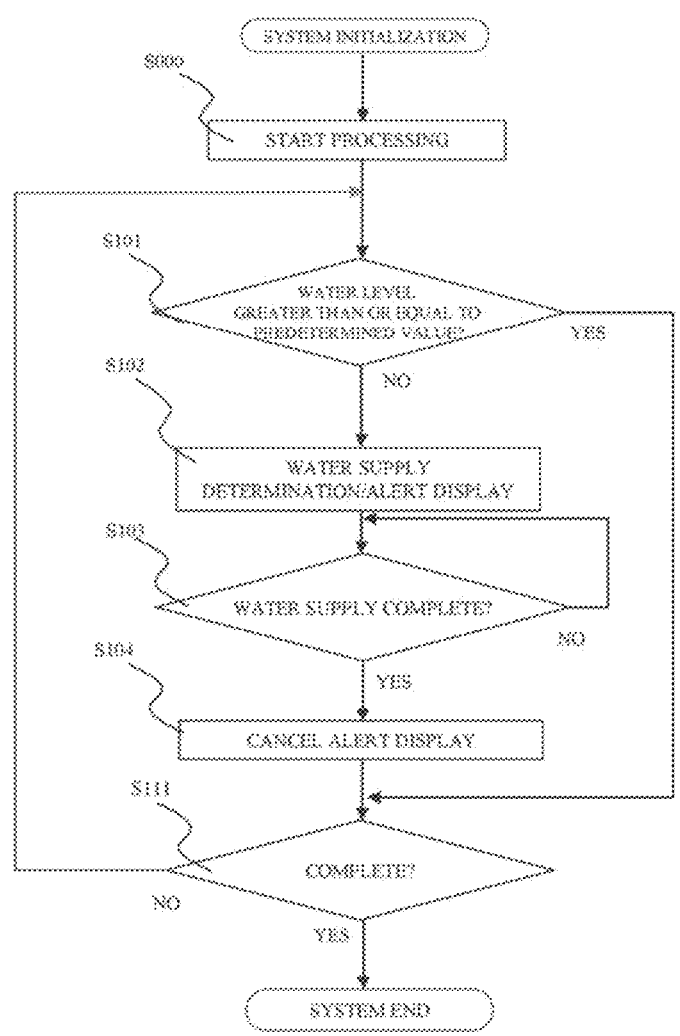
FIG. 4 is a flowchart illustrating different fault detection operations of the electrostatic atomizing system according to Embodiment 1.

Additionally, steps S105 to S106 and/or steps S107 to S108 may be executed together with the fault detection operation (FIG. 3) and/or the water supply alert display operation (FIG. 4) of Embodiment 1.

2-3 Features and the Like

In the electrostatic atomizing system 201 and the method for fault detection used in this system according to Embodiment 2, the temperature and the humidity of the supplied air or the voltage value and the current value of the power source are acquired and, on the basis of these pieces of information, it is possible to determine the charged particulate water production state, which is conventionally difficult to detect. As a result, it is possible to appropriately notify an administrator as to whether charged particulate water is produced properly.

3. Other Embodiments

Figure 7A:
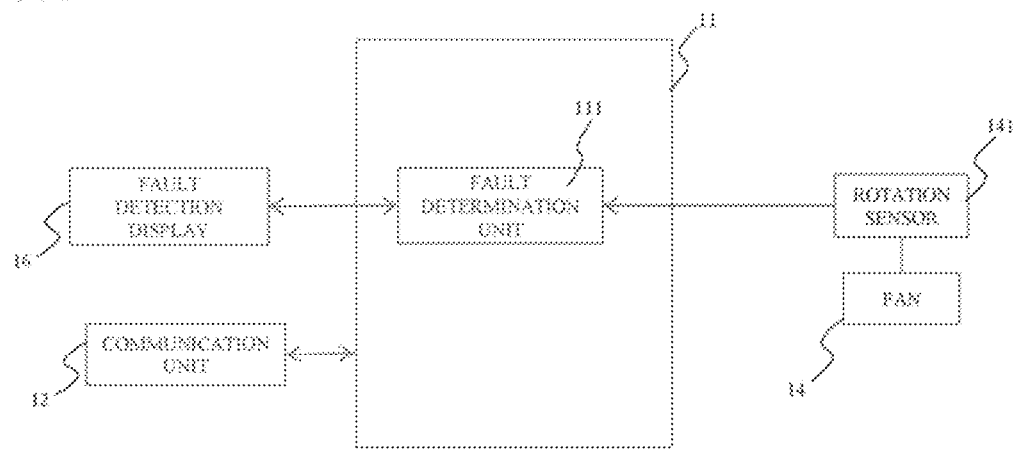
FIG. 7A illustrates a configuration that carries out fault detection by an electrostatic atomizing system according to another embodiment.

In the electrostatic atomizing systems 1 and 201 of the embodiments described above, fault detection of the fan 14 that generates the flow of air in the air flow path 200 may be carried out. In this case, as illustrated in FIG. 7A, the fault determination unit 111 of the control unit 11 acquires a rotation speed from a rotation sensor 141 connected to the fan 14, and compares this rotation speed with a value of the rotation speed of the fan 14 at normal operation, which is stored in advance in the memory. As a result of this comparison, a determination such as the rotation speed being excessively slow, or the like, is obtained, and the determination results may be displayed on the fault detection display 16 and/or sent to the management system 2 via the communication unit 12.

Figure 7B:
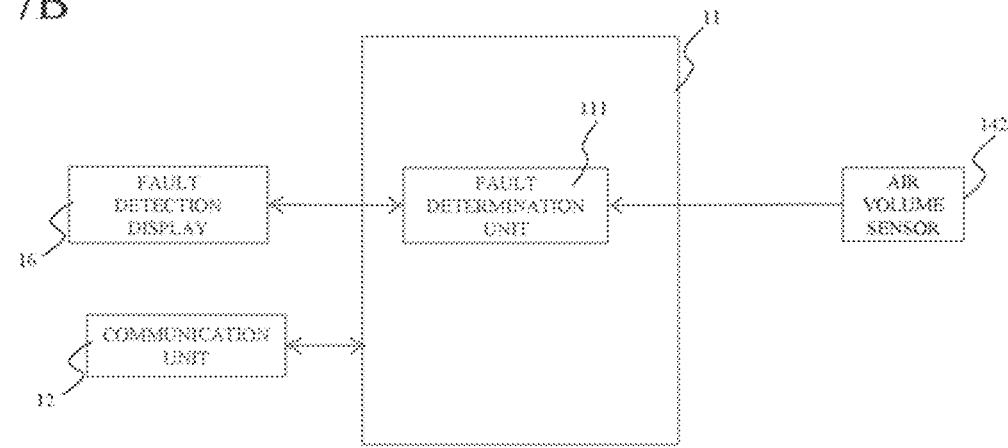
FIG. 7B illustrates another configuration that carries out fault detection by an electrostatic atomizing system according to another embodiment.

In the electrostatic atomizing systems 1 and 201 of the embodiments described above, fault detection of the flow of air in the air flow path 200 may be carried out. In this case, as illustrated in FIG. 7B, the fault determination unit 111 of the control unit 11 acquires a measurement value of an air volume from an air volume sensor 142 disposed in the air flow path 200, and compares this air volume with a value of an air volume at normal operation, which is stored in advance in the memory. As a result of this comparison, a determination such as the air volume being excessively low, or the like, is obtained, and the determination results may be displayed on the fault detection display 16 and/or sent to the management system 2 via the communication unit 12.

A configuration is possible in which the humidifying device 10 or 210 and the electrostatic atomizing apparatus 30 of the electrostatic atomizing system 1 or 201 of the embodiments described above are implemented as a single unit. Additionally, a configuration is feasible in which a portion of the components of the humidifying device 10 or 210 illustrated in FIG. 1 or 5, and the like is disposed on the electrostatic atomizing apparatus 30 side.

In the embodiments described above, an example is described in which an aircraft is the space in which the electrostatic atomizing systems 1 and 201 are used, but the space in which the electrostatic atomizing systems 1 and 201 are used is not limited thereto. The electrostatic atomizing systems 1 and 201 may be installed in a train, a bus, a marine vessel, or other vehicle, or in a facility located in a low humidity environment.

General Interpretation of Terms

In understanding the scope of the present disclosure, the term "configured" as used herein to describe a component, section, or a part of a device includes hardware and/or software that is constructed and/or programmed to carry out the desired function.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member," or "element" when used in the singular can have the dual meaning of a single part or a plurality of parts.

While only selected exemplary embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the exemplary embodiments according to the present inven-

What is claimed:

1. An electrostatic atomizing system, comprising:
an air flow path having an air intake port and an air exhaust port;
a humidifying device operable to humidify air taken in through the air intake port;
an electrostatic atomizing apparatus, downstream of the humidifying device, including an electrode section operable to produce charged particulate water by causing water in the air humidified by the humidifying device to condense on an electrode and applying voltage to the electrode, the electrostatic atomizing apparatus operable to exhaust air that includes the charged particulate water through the air exhaust port;
a first sensor located in the air flow path between the humidifying device and the electrostatic atomizing apparatus in the air flow path operable to sense at least one of humidity and temperature of the air humidified by the humidifying device; and
a control unit including circuitry operable to determine, based on a sensing result of the first sensor, if there is a fault in the humidifying device or the electrostatic atomizing apparatus, and outputs a result of the determination.

2. The electrostatic atomizing system according to claim 1, further comprising
a second sensor operable to sense at least one of humidity and temperature of the air before being humidified by the humidifying device, wherein
the control unit is operable to determine, based on the sensing result of the first sensor and a sensing result of the second sensor, if there is a fault in the humidifying device or the electrostatic atomizing apparatus.

3. The electrostatic atomizing system according to claim 2, wherein the control unit is operable to determine, based on the sensing result of the second sensor or a difference between the sensing result of the first sensor and the sensing result of the second sensor, if there is a fault in the humidifying device or the electrostatic atomizing apparatus.

4. The electrostatic atomizing system according to claim 1, wherein the fault indicates at least one of an insufficiency of humidity, a failure of a fan operable to generate the air flow path, clogging of a humidification filter disposed in the humidifying device, and a fault in a production state of the charged particulate water.

5. The electrostatic atomizing system according to claim 1, further comprising
a third sensor operable to sense at least one of a voltage and a current supplied to the electrode section, wherein
the control unit is operable to determine, based on a sensing result of the third sensor, a production state of the charged particulate water, and output the result of the determination.

6. The electrostatic atomizing system according to claim 1, wherein the control unit is operable to determine, based on the sensing result of the first sensor, a production state of the charged particulate water, and output the result of the determination.

7. The electrostatic atomizing system according to claim 1, wherein
the humidifying device includes a container configured to hold a liquid,
the electrostatic atomizing system further includes a fourth sensor operable to sense an amount of the liquid in the container, and
the control unit is operable to determine, based on a sensing result of the fourth sensor, whether there is a need to supply water to the container, and output the result of the determination.

8. The electrostatic atomizing system according to claim 7, wherein the sensing result of the fourth sensor includes at least one of whether there is a need to supply water to the container and a prediction of a time of supplying water to the container.

9. The electrostatic atomizing system according to claim 1, further comprising
at least one fan operable to create a flow of air in the air flow path, and
a rotation sensor operable to sense a rotation speed of the at least one fan, wherein
the control unit is operable to acquire the rotation speed of the at least one fan sensed by the rotation sensor, determine, based on the rotation speed, whether there is a fault in the at least one fan, and output the result of the determination.

10. The electrostatic atomizing system according to claim 1, further comprising
at least one fan operable to create a flow of air in the air flow path, and
an air volume sensor operable to sense an air volume in the air flow path, wherein
the control unit is operable to determine, based on the air volume sensed by the air volume sensor, whether there is a fault in the at least one fan, and output the result of the determination.

11. The electrostatic atomizing system according to claim 1, further comprising
a display operable to display the result output by the control unit.

12. A system, comprising:
the electrostatic atomizing system according to claim 1; and
a management system connectable to the electrostatic atomizing system, the management system including a display operable to display the result output by the control unit of the electrostatic atomizing system.

* * * * *